No. 851,857. PATENTED APR. 30, 1907.
J. M. M. BLANCHARD.
ANTISKIDDING DEVICE.
APPLICATION FILED APR. 4, 1906.

Witnesses
Inventor
J. M. M. BLANCHARD
By his Attorneys

UNITED STATES PATENT OFFICE.

JULIEN M. M. BLANCHARD, OF NEW YORK, N. Y.

ANTISKIDDING DEVICE.

No. 851,857.　　　Specification of Letters Patent.　　　Patented April 30, 1907.

Application filed April 4, 1906. Serial No. 309,732.

*To all whom it may concern:*

Be it known that I, JULIEN M. M. BLANCHARD, a citizen of the Republic of France, residing at the city, county, and State of New York, have invented certain new and useful Improvements in Antiskidding Devices, of which the following is a full, clear, and exact description.

My invention relates to improvements in apparatus and means for preventing vehicle wheels from slipping or "skidding," as it is termed.

The invention is particularly useful in connection with vehicles which employ broad faced tires, such as pneumatic tires. Its construction is simple and effective and may be quickly and easily applied or removed. The construction likewise is such that creeping is prevented.

Figure 1:
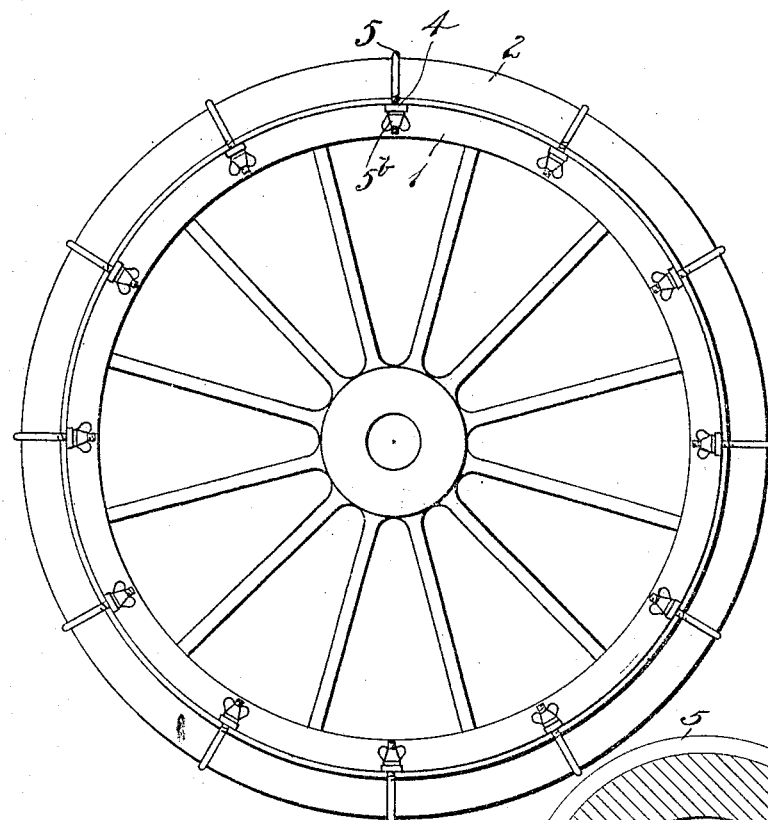
Figure 2:
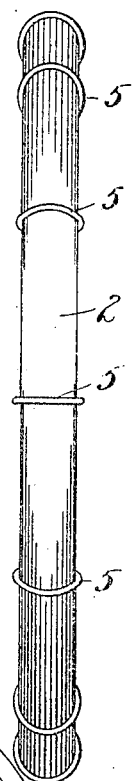
Figure 3:
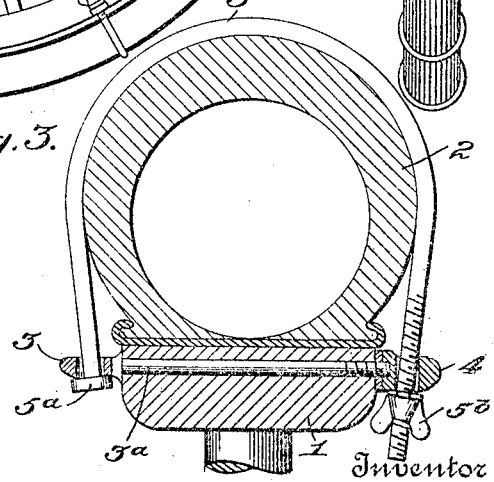

In the drawings Figure 1 is a conventional illustration of a wheel fitted with my improved anti-skidding device, the same being shown in side elevation. Fig. 2 is an end elevation of the wheel shown in Fig. 1. Fig. 3 is a cross section relatively enlarged.

1 is the wheel felly.

2 is the tire.

3 is an abutment on one side of the wheel or felly. 4 is an abutment on the other side of the wheel or felly. These abutments may or may not be independent. In the particular form shown, however, they are connected, the abutment 3 being provided with a long shank 3ª, which extends through a suitable recess or perforation in the felly 1 and affords a bearing for the abutment 4 at the opposite end, the latter screwing on to said shank in such a manner as to give an effective connection.

5 is a metallic strap-like device having a head 5ª at one end. This end is anchored by the abutment 3, while the other end passes through the abutment 4 and may be secured thereto in any suitable way, for example, by a wing-nut 5ᵇ. In the particular form shown the abutments 3—4 are slotted, the sides of the slots affording a freedom of play for the ends of the strap member 5, so that as the tread of the tire encounters the grounds and tends to flatten out, the strap member 5 may if required have a freedom of motion in the abutments 3—4.

Any desired number of the strap members 5 may be employed, spaced apart at suitable intervals entirely around the wheel. By being secured to rigid abutments, creeping is prevented, so that all danger of chafing or cutting the tire by said creeping action is avoided. The strap or cable is, of course, sufficiently flexible and the edges thereof are smoothed off or rounded so that the danger of cutting the tire from this source is avoided.

What I claim is:

1. An anti-skidding device for wheel tires comprising fixed abutments rigidly carried by the wheel, and a plurality of continuous resilient members connected to said abutments and extending transversely across the tread of the tire.

2. An anti-skidding device for wheel tires comprising fixed abutments rigidly carried by the wheel, and a plurality of continuous resilient members connected to said abutments and extending transversely across the tread of the tire and removable therefrom.

3. In an anti-skidding device for wheels, a wheel, a plurality of removable abutments carried thereby, a tire carried thereby, and a plurality of removable resilient devices detachably secured to said abutments and extending transversely across the face or tread of the tire and furnishing an unbroken traction grip.

JULIEN M. M. BLANCHARD.

Witnesses:
R. C. MITCHELL,
L. VREELAND.